United States Patent [19]

Shaw et al.

[11] 3,936,156
[45] Feb. 3, 1976

[54] JEWELRY DISPLAY AND VIEWING DEVICE

[76] Inventors: Jerry Shaw, 50 W. Fairlawn Blvd.;
Samuel G. Solitt, 2121 Brookshire Road, both of Akron, Ohio 44313

[22] Filed: Aug. 14, 1974

[21] Appl. No.: 497,265

[52] U.S. Cl. ............... 350/235; 240/2 AD; 240/6; 350/238; 350/239; 350/247; 350/301
[51] Int. Cl.² .................. G02B 5/08; G02B 27/02
[58] Field of Search ........ 63/30; 206/75; 240/2 AD, 240/4.2, 6; 350/235, 236–239, 247, 288, 299, 301, 305, 306

[56] References Cited
UNITED STATES PATENTS

| | | | |
|---|---|---|---|
| 371,457 | 10/1887 | Hersh et al. | 350/301 |
| 1,593,176 | 7/1926 | Johnson | 350/305 X |
| 2,171,054 | 8/1939 | Williams | 350/301 X |
| 2,176,329 | 10/1939 | Chambers | 350/239 |
| 2,533,747 | 12/1950 | Thienemann | 350/239 |

Primary Examiner—Alfred E. Smith
Assistant Examiner—F. L. Evans
Attorney, Agent, or Firm—Perry Reese Taylor, Esq.

[57] ABSTRACT

A combined display and viewing device intended to be used in connection with the sale of jewelry including an upstanding three-sided frame member having mirrors mounted on its interior surfaces and mounted on a base. Also included is an adjustable magnifying means which is adjustable either vertically with regard to the base and rotatably about its mounting axis or both. A light source is mounted on the frame so that it substantially overlies the magnifying means, and in this fashion a piece of jewelry such as, for example, a ring can be placed on the hand of the prospective purchaser, following which the purchaser's hand is placed under the magnifying means and the light source is activated, and the purchaser will be able to obtain a clear impression from all vantage points of the appearance of the piece of jewelry.

5 Claims, 7 Drawing Figures

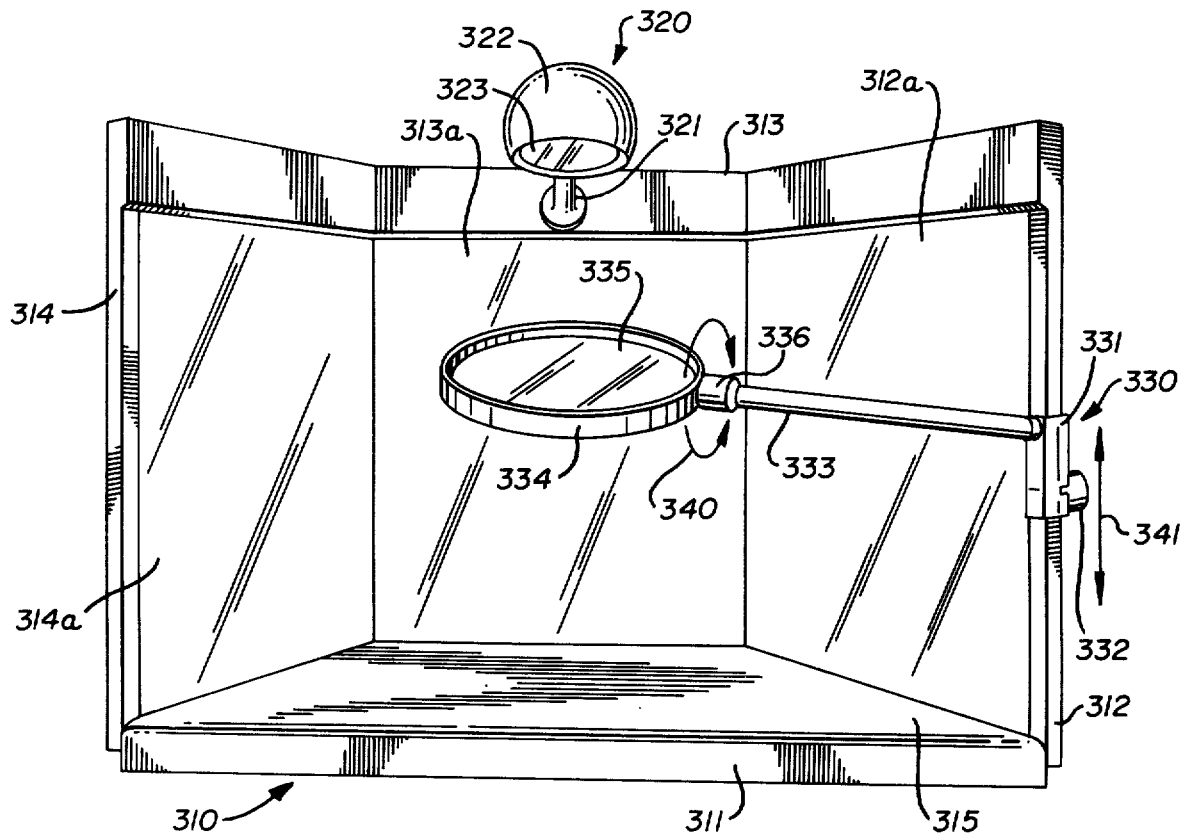
FIG. 4
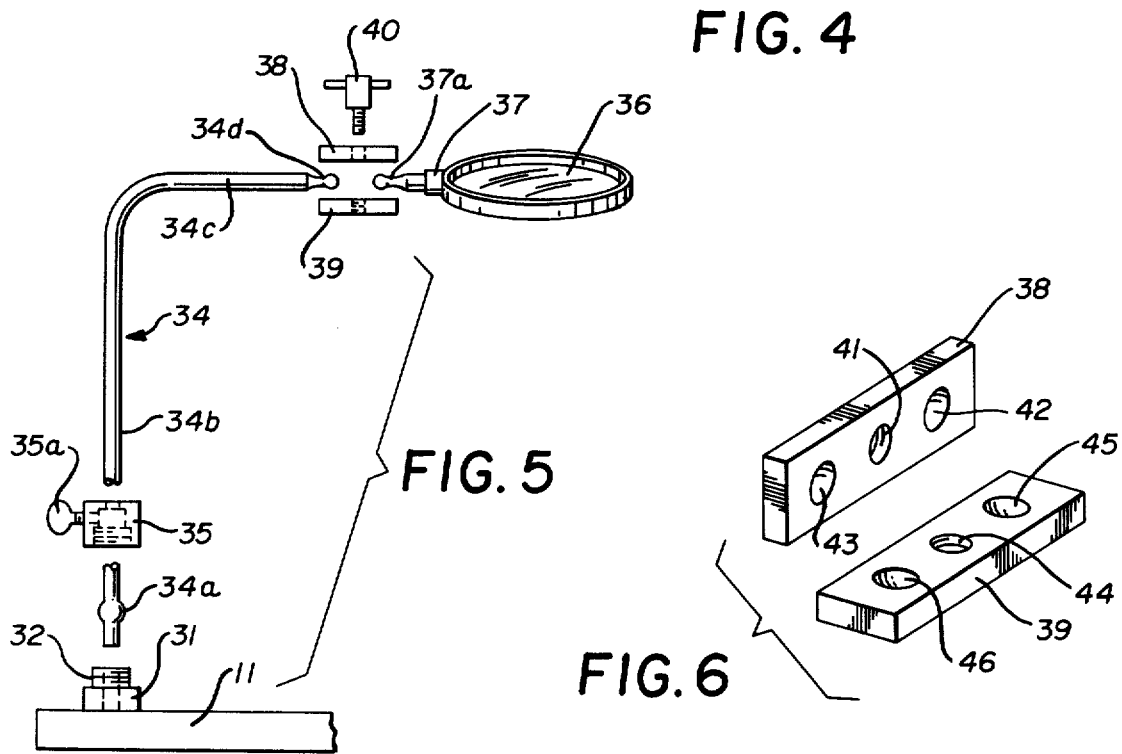
FIG. 5
FIG. 6

JEWELRY DISPLAY AND VIEWING DEVICE

BACKGROUND OF THE INVENTION

This invention relates, in general, to the field of jewelry merchandising and, in particular, relates to a unique device for displaying and examining a piece of jewelry.

DESCRIPTION OF THE PRIOR ART

The following prior art patents are known to Applicant:

| | |
|---|---|
| Marchand | U.S. Patent 1,859,592 |
| Scruggs | U.S. Patent 1,956,205 |
| Kibbe | U.S. Patent 2,199,107 |
| Springer | U.S. Patent 2,853,594 |
| Botham | U.S. Patent 2,867,353 |
| Moffatt | U.S. Patent 3,087,381 |
| Elings | U.S. Patent 3,647,284 |
| Wilson | U.S. Patent 3,700,877 |

These prior art patents show a number of various devices for facilitating the inspection and viewing of various objects, including in some instances jewelry, and also involving in some instances the use of mirrors or lights. While some of these patents are in the general field of jewelry display and the enhancement thereof, it is believed that none of them disclose the relatively simple, yet efficient device described below which possesses both a high degree of utility to accomplish the purpose for which it is designed while presenting a pleasing and attractive aesthetic appearance as well.

BRIEF SUMMARY OF THE INVENTION

In the field of jewelry sales it is often advantageous to enable a prospective purchaser to both examine the piece of jewelry in great detail, such as by means of a magnifying glass, and to give him some idea of the impression the piece of jewelry would have to other parties when it is being worn.

It has been found that a simple but unique means can be developed for these purposes by providing a three-sided, generally U-shaped frame with a plurality of mirrors on the inner surfaces thereof. The frame is mounted on a base and is normally utilized in a free-standing or upstanding position.

In combination with a frame of this type, by providing magnifying means mounted thereon and by making these means adjustable vertically, the magnifying means can be effeciently utilized by moving the same toward or away from the object being examined.

It has also been found that if the magnifying means are rotatable about their point of mounting, they can also be utilized to examine all facets of the piece of jewelry being inspected or viewed.

It has further been found that by providing a light source mounted on the frame and disposed so as to generally overlie the magnifying means, improved illuminated viewing and observation can be provided.

Accordingly, production of an improved display and viewing device of the character described becomes the principal object of this invention, with other objects thereof becoming more apparent upon a reading of the following brief specification considered and interpreted in view of the drawings.

OF THE DRAWINGS

FIG. 4 is a view similar to FIG. 1 showing a further modification.

FIG. 5 is a detailed view of the means of mounting the magnifying device of FIG. 1.

FIG. 6 is a perspective view of the clamping plates of FIG. 5.

DESCRIPTION OF THE PREFERRED EMBODIMENTS

Figure 1:
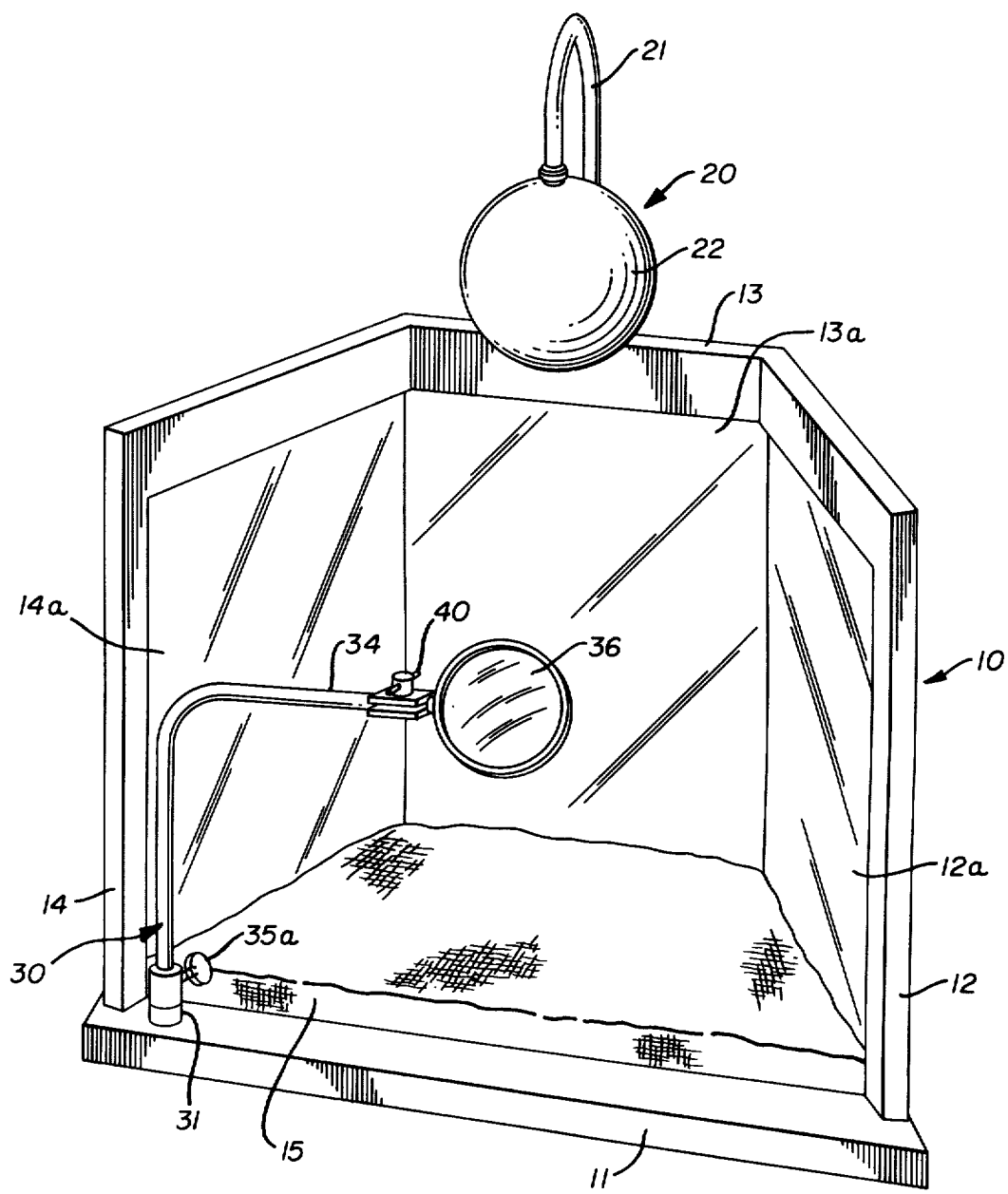
FIG. 1 is a front elevational view of one form of the invention.

Referring first to FIG. 1, it will be noted that the display and viewing device, generally indicated by the numeral 10, includes a base 11 having a cushioned support surface 15 thereon and a frame comprising three interconnected frame elements 12, 13, and 14 arranged in a generally U-shaped configuration.

Each of the frame elements 12, 13, and 14 has a mirror 12a, 13a, and 14a mounted on its inner surface. The means and method of mounting the mirrors has not been explained in detail since it would be well within the skill of one knowledgeable in this art.

Additionally mounted on one of the frames, and in this instance the frame element 13, is a light source 20 which includes a support arm 21 and a shade 22 and of course the usual bulb (not shown).

The viewing means consist in this instance of a magnifying glass 36 which is mounted on an L-shaped support arm 34 which is in turn mounted to the base 11.

Referring to FIGS. 5 and 6 for a more detailed consideration of the magnifying means, it will be noted that a fixture 31 is secured to the base 11 and has a reduced diameter threaded portion 32 projecting upwardly therefrom. This fitting 31 is hollow for purposes which will now be described.

The L-shaped support arm 34 has a top extending portion 34c, a mid portion 34b which is normally disposed in a vertical mode, and a bulbous lower end portion 34a. The end portion 34a is intended to be inserted into the reduced diameter portion of the fitting 31, following which the slip ring 35, which is appropriately bored interiorly, is slipped over the bulbous portion and the wing nut 35a is tightened to lock the arm 34 in position. Of course, by loosening the wing nut, the device could be swiveled as desired.

The upper more or less horizontally projecting end 34c of the arm 34 terminates in a reduced diameter bulbous portion 34d for purposes which will be described below. The magnifying means 36 also has a support arm 37 which also terminates in a bulbous end 37a. In order to clamp the magnifying means 36 to the arm 34, a pair of opposed plates 38 and 39 are provided. These plates are identical and include a through threaded central bore 41,44, and in each instance the through central bores 41,44 are flanked by opposed depressions 42,43 and 45,46. In operation the plates 38 and 39 are clamped over the bulbous portions 34d and 37a, with the bulbous portions being received in the depressions 42,43 and 45,46. The locking nut or wing nut 40 is then threaded into place to firmly clamp the magnifying means to the support arm 34. Of course due to the utilization of the bulbous ends and the depressions, the magnifying means can be rotated about the axis of its arm 37 to enhance the viewing characteristics of the device.

In use of the device shown in FIGS. 1, 5, and 6, the piece of jewelry such as, for example, the ring is placed on the finger of the viewer, and the light source 20 is activated. It is then possible to place the hand beneath the magnifying glass 36 which, of course, can be adjusted as described above. Following this the purchaser will be able to obtain a realistic impression of the appearance of the article of jewelry both through means of the magnifying means 36 and by reflection from the mirrors 12a, 13a, and 14a.

Figure 2:
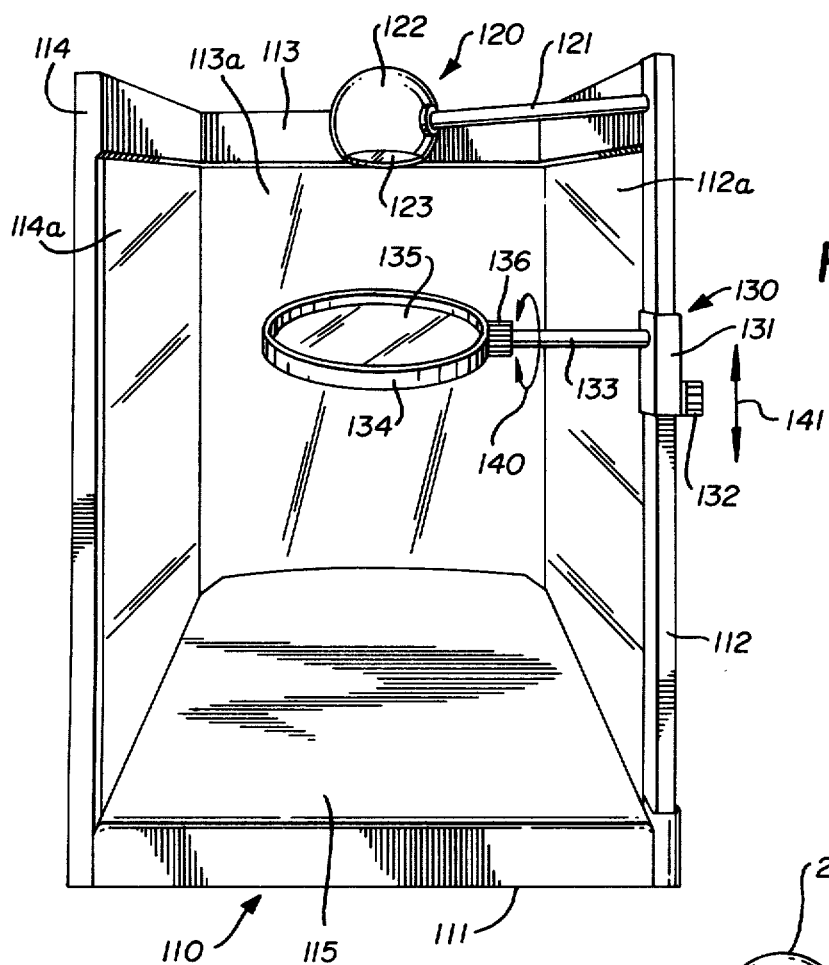
FIG. 2 is a view similar to FIG. 1 showing a modified form of the invention.

FIG. 2 shows a modified form of the invention 110 which again has a base 111 with a cushioned support 115 and frame elements 112, 113, and 114 carrying mirrors 112a, 113a, and 114a.

In this form of the invention the magnifying means 130 are similar to the magnifying means 30 in FIG. 1 in that they include a bracket 131, a locking nut 132, a support arm 133, a second locking nut 136, and a ring 134, and magnifying glass 135. In this form of the invention the light source is mounted from the side frame 112 by means of the arm 121 and, of course, also includes the globe or shade 122 and bulb 123. Utilization of the device of FIG. 2 is identical with that of FIG. 1, with the magnifying means being adjustably movable in the direction of arrows 140,141.

Figure 3:
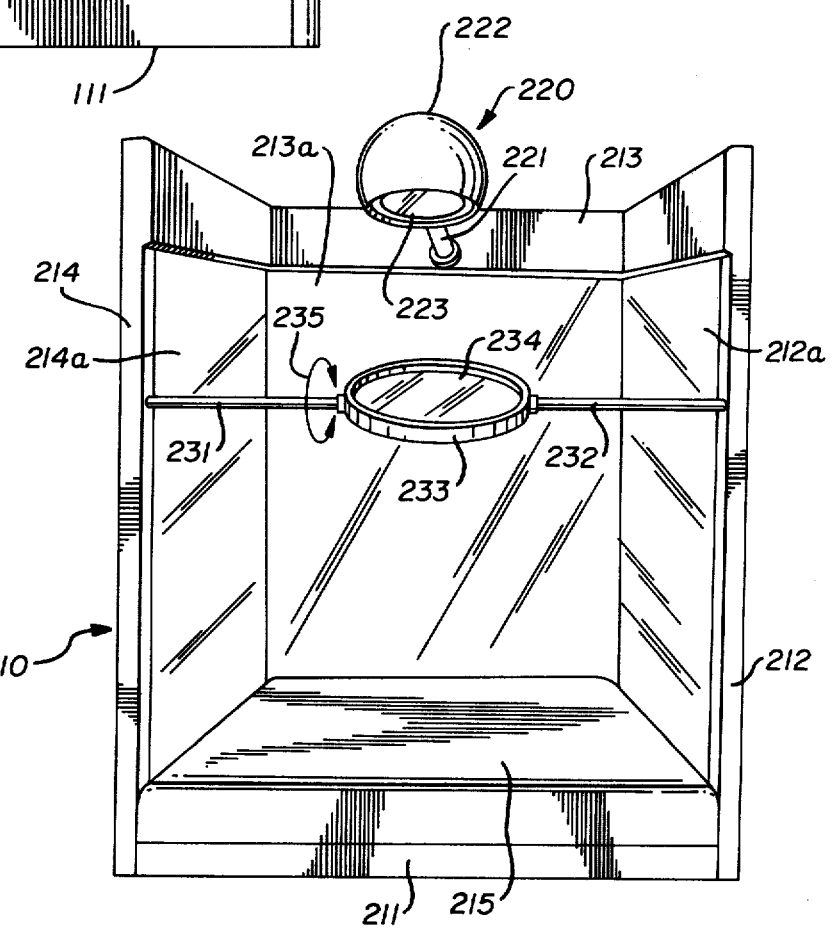
FIG. 3 is a view similar to FIGS. 1 and 2 showing a still further modification.

FIG. 3 shows a further modification 210 which includes the three frame elements 212, 213, and 214 mounted on the base 211, which has a cushioned support 215, and includes a light means 220 with its mounting arm 221 and shade 222 and bulb 223.

Mirrors 212a, 213a, and 214a are also included as described above with regard to the form of the invention shown in FIGS. 1 and 2.

In this form of the invention the magnifying means are mounted by means of the support rods 231 and 232 which project from the sides of opposed frame elements 212 and 214. The ring 233 which carries the magnifying glass 234 is pivotally mounted on the ends of the rods 231 and 232 and therefore can rotate in the direction of the arrow 235.

Referring next to FIG. 4, it will be noted that the display and viewing device shown therein is another modified structure, generally indicated by the numeral 310, which includes a base 311 having a cushioned support 315 and a frame comprising three interconnected frame elements 312, 313, and 314 arranged in a generally U-shaped configuration.

Each of these frame elements 312, 313, and 314 has a mirror 312a, 313a, and 314a mounted on its inner surface.

Additionally mounted on one side of frame 312 is a magnifying means 330. This magnifying means includes a mounting bracket 331 and lock nut 332 which in conventional fashion can be turned so as to bear against the edge of the frame 312 to hold the bracket 331 in its desired position. In this regard, of course, the bracket 331 itself is movable in the direction of the arrow 341 in a vertical mode along the edge of frame 312. It should be noted here that the magnifying means could also be mounted on frame element 314 if desired.

Projecting from bracket 331 is an elongate mounting arm 333 which receives a locking nut 336 on its outboard end. Secured to the locking nut 336 is a ring 334 which carries a magnifying glass 335, with it being understood that the nut 336 can be twisted so as to alter the position of the magnifying glass 335 is the direction of the arrow 340. Nut 336 can either be simply telescoped over the end of arm 333, or the arm and the nut can be complementally threaded as desired.

A light source 320 is also provided and in this instance is mounted on the top of center frame element 313 and includes a support arm 321 and a shade 322 and, of course, the usual bulb 323.

Figure 7:
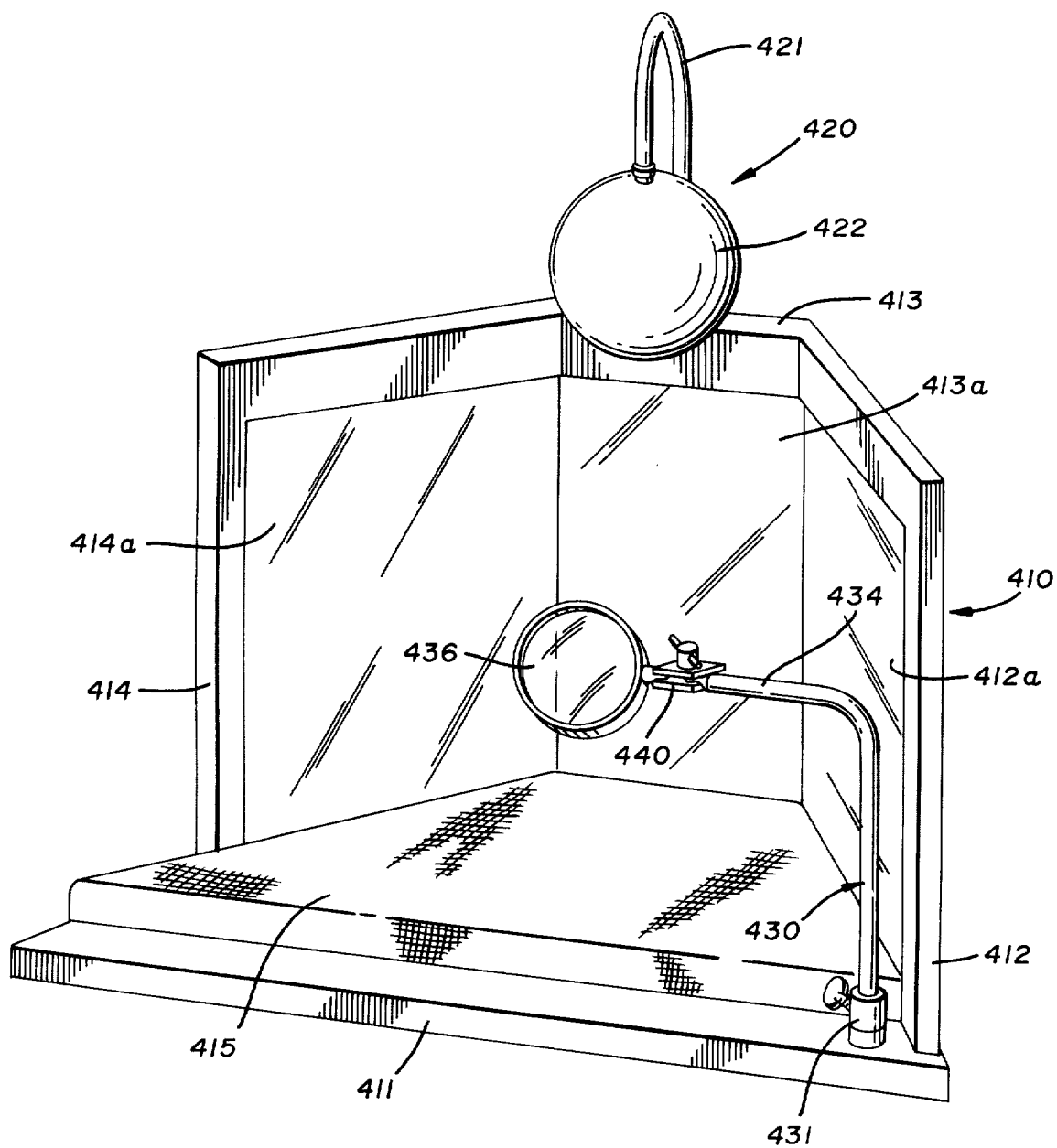
FIG. 7 is a view similar to FIG. 1 showing an additional modification.

Turning next then to FIG. 7, it will be shown that a still further modification of the basic inventive concept is disclosed, with this particular modification having primary utility in connection with the display and examination of pieces of jewelry other than rings, such as watches, bracelets, etc., in which the forearm of the wearer would be inserted into the viewing area rather than merely the hand as would be the case with rings.

Accordingly the overall display unit, generally indicated by the numeral 410, includes a base 411 having a cushioned support 415 and a frame comprising three interconnected frame elements 412, 413, and 414 arranged in a generally U-shaped configuration. In this particular form of the invention, however, it should be noted that the frame element 414 is elongated with respect to frame elements 413 and 412. Similarly, a support 415 and base 411 are also elongated and symmetrical so that the forearm and wrist of the customer can be placed on the support 415.

Each of the frame elements 412, 413, and 414 has a mirror 412a, 413a, and 414a mounted on its inner surface in much the same manner as in the forms of the invention shown in FIGS. 1 through 6. Additionally, a light source 420, including a support 421 and a cover 422, is provided adjacent the center frame element 413 as described above.

The magnifying means 430 are similar to the magnifying means shown in FIG. 1 of the drawings, but since the device of FIG. 7 is elongated as described above and in this particular instance is designed for viewing from the left, the magnifying means 430 have been placed to the right of the base 411. These means, of course, include the mounting bracket 431, the support arm 434, the magnifying glass 436, and the mounting means 440. Operation of the magnifying means is identical to that described above.

Accordingly several modifications of the basic principle have been illustrated, all of which, however, employ the basic principles utilized and described in connection with the form of the invention shown in FIGS. 1, 5, and 6.

Accordingly it has been shown how a simplified, yet unique, improved viewing device can be provided which will permit the prospective purchaser a realistic impression of the appearance the jewelry will create when it is being worn.

Thus in all forms of the invention disclosed herein, a 360° perspective of the jewelry, whether it be a ring, watch, bracelet, or other form of jewelry, is possible so that the customer can have an accurate impression of the impression which the jewelry will make on third parties. Furthermore, utilization of the magnifying means, of course, permits intimate details of the piece of jewelry to be observed.

While a full and complete description of the invention has been set forth in accordance with the dictates of the Patent Statutes, it should be understood that modifications can be resorted to without departing from the scope of the appended claims or the spirit

What is claimed is:

1. A jewelry display and viewing device, comprising:
   A. a plurality of interconnected upstanding frames;
   B. a mirror mounted on the inner surface of each of said frames:
   C. a base member having upper and lower planar faces;
   D. a cushion member mounted on said upper planar face of said base member;
   E. said frames being secured to the periphery of said base member and projecting upwardly therefrom;
   F. an adjustable magnifying device disposed in overlying relationship with said base member; and
   G. a light source
      1. carried by one of said frames
      2. in overlying relationship with said base member
      3. and in substantially overlying relationship with said magnifying device.

2. The device of claim 1 wherein said frames include first, second, and third interconnected frame components; said first and second components being disposed in substantially opposed relationship to each other; said third component interconnecting said first and second components to form a substantially U-shaped viewing compartment; said cushioned base member being disposed within said viewing compartment.

3. The device of claim 1 wherein said magnifying device is mounted on said base member and is movable into and out of overlying relationship with said cushion member; said magnifying device being adjustable about an axis lying parallel to said cushion member.

4. The device of claim 1 wherein said magnifying device is mounted on an edge surface of one of said upstanding frames for vertical movement with respect thereto; said magnifying means being adjustable about an axis parallel to said cushion member.

5. The device of claim 2 wherein said magnifying device is suspended between said first and second components; said magnifying device being adjustable about an axis parallel to said cushion member.

* * * * *